US010921153B2

(12) United States Patent
Kuriakose et al.

(10) Patent No.: US 10,921,153 B2
(45) Date of Patent: Feb. 16, 2021

(54) SYSTEM AND METHOD TO CONSTRUCT A MAGNETIC CALIBRATION (MAG-CAL) PATTERN FOR DEPICTING THE PROGRESS OF A CALIBRATION OF A MAGNETOMETER OF AN AIRCRAFT DISPLAYED BY A COCKPIT DISPLAY

(71) Applicant: HONEYWELL INTERNATIONAL INC., Morris Plains, NJ (US)

(72) Inventors: Sanju Kuriakose, Bangalore (IN); Sriram P R, Chennai (IN); John R. Morrison, Minneapolis, MN (US); Mark Ahlbrecht, Champlin, MN (US)

(73) Assignee: HONEYWELL INTERNATIONAL IN., Charlotte, NC (US)

( * ) Notice: Subject to any disclaimer, the term of this patent is extended or adjusted under 35 U.S.C. 154(b) by 77 days.

(21) Appl. No.: 16/153,416

(22) Filed: Oct. 5, 2018

(65) Prior Publication Data
US 2020/0109965 A1 Apr. 9, 2020

(51) Int. Cl.
G01C 23/00 (2006.01)
B64D 43/00 (2006.01)
(Continued)

(52) U.S. Cl.
CPC ........... *G01C 23/005* (2013.01); *B64D 43/00* (2013.01); *G01C 17/38* (2013.01); *G08G 5/0039* (2013.01)

(58) Field of Classification Search
CPC ...... G01C 17/38; G01C 21/08; G01C 21/165; G01C 23/005; G01C 23/00;
(Continued)

(56) References Cited

U.S. PATENT DOCUMENTS 4,870,602 A 9/1989 Baumker
5,581,899 A * 12/1996 Brehler .................. G01C 17/38
33/356
(Continued)

FOREIGN PATENT DOCUMENTS

CA 2683254 A1 * 4/2010

OTHER PUBLICATIONS

Lars Thrane, "LT-500 Attitude Reference Heading System" brochure, Sep. 7, 2016, 4 pages (Year: 2016).*
(Continued)

Primary Examiner — Faris S Almatrahi
Assistant Examiner — David A Testardi
(74) Attorney, Agent, or Firm — Lorenz & Kopf, LLP

(57) ABSTRACT

Methods, apparatuses and systems for use of a magnetometer calibration (MAG-CAL) application to calibrate a magnetometer while an aircraft is in-flight including: generating a MAG-CAL calculated pattern based on a set of aircraft parameters for the in-air magnetometer calibration, the set of aircraft parameters at least comprise: speed, bank angle, altitude and position of the aircraft; generating a set of waypoints that define a calibration flight path corresponding to the MAG-CAL calculated pattern; Configuring the calibration flight path of the MAG-CAL calculated pattern to be part of the original flight path of the in-flight aircraft to enable the aircraft while flying the original flight to proceed in part on the calibration flight path corresponding to the MAG-CAL calculated pattern; and enabling the aircraft to deviate while in-flight from the original flight path to the calibration flight path to enable a sufficient level of calibration for accurate magnetometer operation.

20 Claims, 9 Drawing Sheets

(51) Int. Cl.
*G01C 17/38* (2006.01)
*G08G 5/00* (2006.01)

(58) Field of Classification Search
CPC .. G01R 33/0035; G01R 33/025; B64D 43/00; G08G 5/0039; B64C 19/00
See application file for complete search history.

(56) References Cited

U.S. PATENT DOCUMENTS

| | | | | |
|---|---|---|---|---|
| 5,682,335 | A * | 10/1997 | Assous | G01C 17/38 33/318 |
| 6,877,237 | B1 * | 4/2005 | Withanawasam | G01C 17/38 33/356 |
| 8,700,317 | B1 | 4/2014 | Wilder et al. | |
| 2004/0122567 | A1 * | 6/2004 | Gaier | G01C 23/00 701/4 |
| 2004/0230351 | A1 * | 11/2004 | Rumbo | G05D 1/0202 701/3 |
| 2009/0267800 | A1 * | 10/2009 | Hammack | G01C 23/00 340/973 |
| 2010/0312509 | A1 * | 12/2010 | Patel | G01C 17/38 702/92 |
| 2012/0096921 | A1 * | 4/2012 | Almalki | H04M 1/72569 73/1.76 |
| 2012/0101762 | A1 * | 4/2012 | Almalki | G01C 17/38 702/85 |
| 2012/0101766 | A1 * | 4/2012 | Snow | G01R 33/0035 702/104 |
| 2012/0130626 | A1 * | 5/2012 | Klooster | G08G 5/025 701/120 |
| 2012/0303184 | A1 * | 11/2012 | Gerthoffert | G01C 23/00 701/7 |
| 2013/0345905 | A1 * | 12/2013 | Parthasarathy | G01C 23/00 701/3 |
| 2013/0345972 | A1 * | 12/2013 | Askarpour | G01C 23/005 701/505 |
| 2014/0188312 | A1 * | 7/2014 | Boorman | G01C 23/00 701/3 |
| 2014/0257684 | A1 * | 9/2014 | Wilder | G08G 5/025 701/121 |
| 2014/0278050 | A1 * | 9/2014 | Askarpour | G01C 17/38 701/400 |
| 2015/0019159 | A1 * | 1/2015 | Elgersma | G01R 35/005 702/150 |
| 2015/0260525 | A1 * | 9/2015 | Parthasarathy | G08G 5/0039 701/538 |
| 2016/0069681 | A1 * | 3/2016 | Johnson | G01C 17/38 33/303 |
| 2016/0178371 | A1 * | 6/2016 | Morrison | G01R 33/0035 702/95 |
| 2016/0187155 | A1 * | 6/2016 | Askarpour | G01C 25/00 701/33.1 |
| 2018/0286257 | A1 * | 10/2018 | Schwartz | G08G 5/0013 |

OTHER PUBLICATIONS

Lars Thrane A/S, "User & Installation Manual, LT-500 AHRS", Document No. 95-100225 Rev. 1.01, Oct. 31, 2016, 54 pages (Year: 2016).*

SKYbrary, "Holding Pattern", Sep. 15, 2017, 5 pages (Year: 2017).*

* cited by examiner

SYSTEM AND METHOD TO CONSTRUCT A MAGNETIC CALIBRATION (MAG-CAL) PATTERN FOR DEPICTING THE PROGRESS OF A CALIBRATION OF A MAGNETOMETER OF AN AIRCRAFT DISPLAYED BY A COCKPIT DISPLAY

TECHNICAL FIELD

The present invention generally relates to in-air magnetic calibration of a magnetometer of an aircraft, and more particularly relates to a system and method to construct specific magnetic calibration patterns to depict in a cockpit display progression towards achieving a sufficient level of magnetometer calibration enabling a correct calculating of a heading angle during a flight phase of an aircraft.

BACKGROUND

The heading angle is a critical calculated parameter by an Attitude and Heading Reference System (AHRS). The AHRS calculates the heading angle based on various measurements of a magnetic field of the earth taken by a magnetometer. The magnetometer (i.e. 3-axis magnetometer) must calibrate out any hard and soft iron effects generated by the aircraft as much as possible, as well as other measurement errors generated such as scale factor and misalignment that corrupt the measurements and add difficultly to directly measuring the earth's magnetic field. Hard iron bias refers to the effect of permanently magnetized material that introduces a bias to earth's magnetic field at the magnetometer location. Soft iron refers to material that is not permanently magnetized but distorts the earth's magnetic field at the magnetometer location. The effects of the magnetometer measurement errors can result in magnetic heading angle errors of 10 degrees or more.

To overcome the effects of these errors timely calibration of the AHRS is required. The magnetic calibration corrects for the effects of magnetometer measurement errors so that magnetic heading angle can be determined accurately. Traditional compass rose (i.e. a circle divided into 32 points or 360° numbered clockwise) magnetic calibration is typically done on the ground through the use of surveyed heading angles, which are compared to the AHRS magnetic heading angle.

Therefore, it is desirable to perform a 3-axis calibration when the aircraft is in flight and to obtain the 3-axis calibration of the magnetometer during the aircraft flight rather than performing this operation at a stationary location on the ground. Further, when such calibration is performed in air, cost-savings and ground personnel reductions can be achieved along with an overall reduction in calibration errors. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a computer-implemented method for calibrating magnetic distortions of an attitude heading reference system (AHRS) installed in an aircraft is provided. The method includes: executing a magnetometer calibration (MAG-CAL) application of the AHRS disposed with a magnetometer while the aircraft is in-flight to enable an in-air calibration of the magnetometer of the aircraft while proceeding on a flight of an original flight-plan; generating, by calculations using software solutions of the MAG-CAL application, a MAG-CAL calculated pattern based on a set of aircraft parameters for the in-air magnetometer calibration, the set of aircraft parameters at least comprise: speed, bank angle, altitude and position of the aircraft; generating, by the MAG-CAL application, a set of waypoints that define a calibration flight path corresponding to the MAG-CAL calculated pattern; configuring, by the MAG-CAL application, the calibration flight path of the MAG-CAL calculated pattern to be part of the original flight path of the in-flight aircraft to enable the aircraft while flying the original flight to proceed in part on the calibration flight path corresponding to the MAG-CAL calculated pattern; and generating position data for lateral and vertical flight paths, by the MAG-CAL application, to enable the aircraft to deviate while in-flight from the original flight path to the calibration flight path wherein the aircraft proceeds on the calibration flight path for a time period to enable a sufficient level of calibration of the magnetometer for operation wherein the sufficient level of calibration is formulated by algorithmic solutions of the MAG-CAL application based on an aircraft flying time period in a calibration region and position to enable a MAG-CAL calibrating process to occur to reach at least one threshold indicative of the sufficient calibration level for the magnetometer operation.

The method, further includes: selecting a prompt of a MAG-CAL calculation system to execute the MAG-CAL application or to modify a set of MAG-CAL parameters used by the MAG-CAL application. The method, further includes: enabling mode annunciations by the AHRS in a cockpit to provide situational awareness by visual and aural alerts to the pilot that a current flight path of aircraft is within a MAG-CAL calculation region. The method, further includes: displaying progress pages of by increments in progress to visually display progress of the in-air MAG-CAL calculation process so that the pilot can determine an approximate in-flight time to complete the MAG-CAL calculation process. The method, further includes: enabling a preview of the MAG-CAL specific pattern for view by the pilot on a cockpit display prior the deviation from the original flight path by the aircraft to the calibration flight path to perform an in-air calibration process. The method, further includes: enabling mode annunciations by the AHRS in the cockpit to provide situational awareness by visual and aural alerts to the pilot of the flight path of aircraft is entering or currently within the MAG-CAL calculation region. The method, further includes: filling-in portions of graphic user interface configured in a symbol to show a desired level of accuracy of a calibration process by a filled-in region in comparison to a not filled-in portion. The method, further includes: configuring a set of modes to display the position of the aircraft approximately prior to and on entry to the calibration region. The method, further includes: configuring the vertical flight path of the aircraft at a constant calibration altitude, latitude and longitude after entry to the calibration region for a calibration process; and configuring the speed of the aircraft at an optimum speed for the calibration process.

In another embodiments, an apparatus for calibrating magnetic distortions of an attitude heading reference system (AHRS) installed in an aircraft is provided. The apparatus includes: at least one processor deployed on a computing device, the at least one processor being programmed to calibrate the AHRS disposed with a magnetometer while the aircraft is in-flight to enable an in-air calibration of the magnetometer of the aircraft while proceeding on a flight of an original flight-plan; the at least one processor having an input coupled to receive sensor data from at least one sensor system deployed on the aircraft; the at least one processor having an associated memory for acquiring a set of aircraft parameter data which at least include: speed, bank angle, altitude and position of the aircraft; the at least one processor being programmed to execute an algorithm which calculates a magnetic calibration (MAG-CAL) pattern based on the set of aircraft parameters for the in-air magnetometer calibration; the at least one processor being configured to generate a set of waypoints that define a calibration flight path corresponding to the MAG-CAL calculated pattern; the at least one processor configuring the calibration flight path of the MAG-CAL calculated pattern to be part of the original flight path of the in-flight aircraft to enable the aircraft while flying the original flight to proceed in part on the calibration flight path corresponding to the MAG-CAL calculated pattern; the at least one processor programmed to generate position data for lateral and vertical flight paths to enable the aircraft to deviate while in-flight from the original flight path to the calibration flight path wherein the aircraft proceeds on the calibration flight path for a time period to enable a sufficient level of calibration of the magnetometer for accurate operation wherein the sufficient level of calibration is formulated by algorithmic solutions of the MAG-CAL application based on an aircraft flying time period in a calibration region and the aircraft position; and the at least one processor programmed to execute the MAG-CAL process to reach at least one threshold indicative of the sufficient calibration level for the accurate magnetometer operation.

The apparatus, further includes: the at least one processor to be responsive to a pilot selection by a prompt to execute the MAG-CAL process or to modify a set of MAG-CAL parameters used in the MAG-CAL process. The apparatus, further includes: the at least one processor being configured to alert the pilot, in instances, by mode annunciations of the AHRS in the cockpit thereby providing situational awareness by visual and aural alerts to the pilot that the flight path of aircraft is within the MAG-CAL calculation region. The apparatus, further includes: the at least one processor programmed with instructions for filling-in portions of graphic user interface configured in a symbol to show a desired level of accuracy of the calibration process by a filled-in region in comparison to a not filled-in portion. The apparatus, further includes: the at least one processor configuring a set of modes to display the position of the aircraft approximately prior to and on entry to the calibration region. The apparatus, further includes: the at least one processor setting the vertical flight path of the aircraft at a constant calibration altitude, latitude and longitude after entry to the calibration region for a calibration process. The apparatus, further includes: the at least one processor setting the speed of the aircraft at an optimum speed for the calibration process.

In yet another embodiment, a system to perform a set of instructions contained on a non-transitory computer-readable medium executed by at least one processor, the system includes: the at least one processor programmed and disposed in a computing device to: implement a magnetometer calibration (MAG-CAL) application hosted by the computing device for calibrating a magnetometer of an aircraft while in-flight to enable an in-air calibration of the magnetometer while proceeding on a flight of an original flight-plan; generate, by calculations using software solutions of the MAG-CAL application, a MAG-CAL calculated pattern based on a set of aircraft parameters for the in-air magnetometer calibration, the set of aircraft parameters at least include: speed, bank angle, altitude and position of the aircraft; generate, by the MAG-CAL application, a set of waypoints that define a calibration flight path corresponding to the MAG-CAL calculated pattern; configure, by the MAG-CAL application, the calibration flight path of the MAG-CAL calculated pattern to be part of the original flight path of the in-flight aircraft to enable the aircraft while flying the original flight to proceed in part on the calibration flight path corresponding to the MAG-CAL calculated pattern; and generate position data for lateral and vertical flight paths, by the MAG-CAL application, to enable the aircraft to deviate while in-flight from the original flight path to the calibration flight path wherein the aircraft proceeds on the calibration flight path for a time period to enable a sufficient level of calibration of the magnetometer for operation wherein the sufficient level of calibration is formulated by algorithmic solutions of the MAG-CAL application based on an aircraft flying time period in a calibration region and position to enable a MAG-CAL calibrating process to occur to reach at least one threshold indicative of the sufficient calibration level for the magnetometer operation.

The system, further includes: to perform a set of instructions to implement: a display in progressive pages of increments of progress to visually display the in-air MAG-CAL calculation process so that the pilot can determine an approximate in-flight time to complete the MAG-CAL calculation process. The system, further includes: to perform a set of instructions to implement: a preview of the MAG-CAL specific pattern for view by the pilot on a cockpit display prior to the deviation from the original flight path by the aircraft to the calibration flight path to perform the in-air calibration process. The system, further includes: to perform a set of instructions to implement: a set of one or more mode annunciations by the AHRS in the cockpit to provide situational awareness by visual and aural alerts to the pilot of the flight path of the aircraft entering or current flight path within the MAG-CAL calculation region. a system for integrating flight crew decision aid applications in an aircraft cockpit is disclosed.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
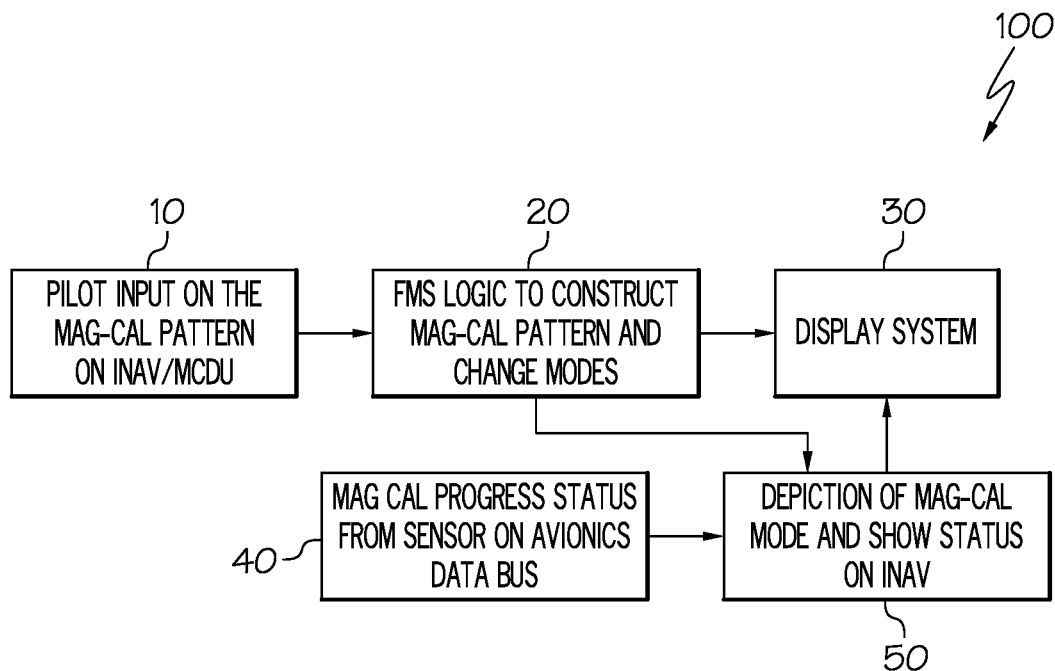
FIG. 1 is a block diagram depicting an example aircraft MAG-CAL pattern calibration system for in-air calibration of the magnetometer in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, touchscreens, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The AHRS (Attitude and Heading Reference System) provides 3D orientation by integrating gyroscopes and fusing this data with accelerometer data and magnetometer data. With sensor fusion, drift from the gyroscopes integration is compensated by reference vectors, namely gravity, and the earth magnetic field. This results in a drift-free orientation, making an AHRS a more cost effective solution than conventional high-grade IMUs (Inertial Measurement Units) that only integrate gyroscopes and rely on a very high bias stability of the gyroscopes. Kalman filtering is used in order to cope with transient accelerations, magnetic disturbances and vibrations, the sensor fusion algorithm in Kalman filtering needs to be adapted for specific applications. An AHRS uses tiny sensors to measure acceleration, and a fast computer chip analyzes those forces and calculates airplane attitude. By sensing acceleration in all axes, the AHRS can calculate how attitude has changed and thus determine the actual attitude of the airplane at any instant. The fundamental part of the calculation is also track over the ground. A remote flux detector measures the earth's magnetic field, and that magnetic information is applied to the track calculation to determine the compass heading shown on the PFD. The AHRS also use air pressure changes in the attitude calculation. A change in vertical speed or airspeed as measured by a digital air data computer can help stabilize and refine the attitude calculation, and these systems are called ADAHRS (air data attitude-heading reference systems The present disclosure describes a MAG-CAL pattern calibration method and system to construct a set of various flight maneuvers required of a pilot in order to calibrate an onboard Attitude and heading reference system (AHRS) system. The MAG-CAL pattern calibration method and system takes into consideration variations in aircraft parameters including GPS, altitude, speed, bank angle and direction of turns at which a MAG-CAL pattern calibration is calculated and constructs a figure eight pattern with this information. A level path is constructed for this pattern which ensures aircraft holds onto the altitude defined in the MAG-CAL patterns page. When aircraft is flying near to the pattern, a MAG-CAL mode annunciation is provided and aircraft goes into a level flight into the MAG-CAL mode.

FIG. 1 is a block diagram depicting an example aircraft MAG-CAL pattern calibration system 100 for in-air calibration of the magnetometer in accordance with some embodiments. The pilot by input at block 10 manually institutes the MAG-CAL pattern calibration system. In various exemplary embodiments, the MAG-CAL pattern calibration system can be automated to trigger a notice via the cockpit display or by audio systems by annunciation that the pilot should, or should consider, turning on the MAG-CAL pattern calibration system during a flight phase. Alternately, the MAG-CAL pattern calibration system could send notifications to be turned on based on pre-configured schedules for calibrating the magnetometer or based on historical data about when such calibrations are required or have been performed in the past for the aircraft. In other words, there are a plethora of ways the triggering of notification and subsequent turning on of the MAG-CAL pattern calibration system can be performed. Next, the flight management system (FMS) logic at block 20, based on sensor inputs of sensed data of aircraft parameters, including GPS, altitude, speed, bank angle and direction of turns, constructs a MAG-CAL pattern using various software application solutions. In addition, the FMS logic changes the mode of the cockpit display system 30 to depict a mode designated as the MAG-CAL pattern calibration mode. In various exemplary embodiments, the MAG-CAL pattern calibration system constructs a figure eight pattern or the like with this information. The MAG-CAL pattern calibration system using the software applications solutions constructs a level path for, in this instance, the figure eight pattern to ensure the aircraft is kept as a constant altitude to prevent distortions and other noise from interfering with the calibration of the magnetometer. That is, changes in altitude can cause inaccuracies in the eventual calibration and subsequent heading direction of the aircraft. Further, to inform the pilot that these parameters are met, the aircraft is level and flying near the calibration pattern or in sync with the calibration pattern; MAG-CAL pattern mode annunciations are provided which allows a pilot to judge or know the amount of time the magnetometer is actually being calibrated.

Figure 2:
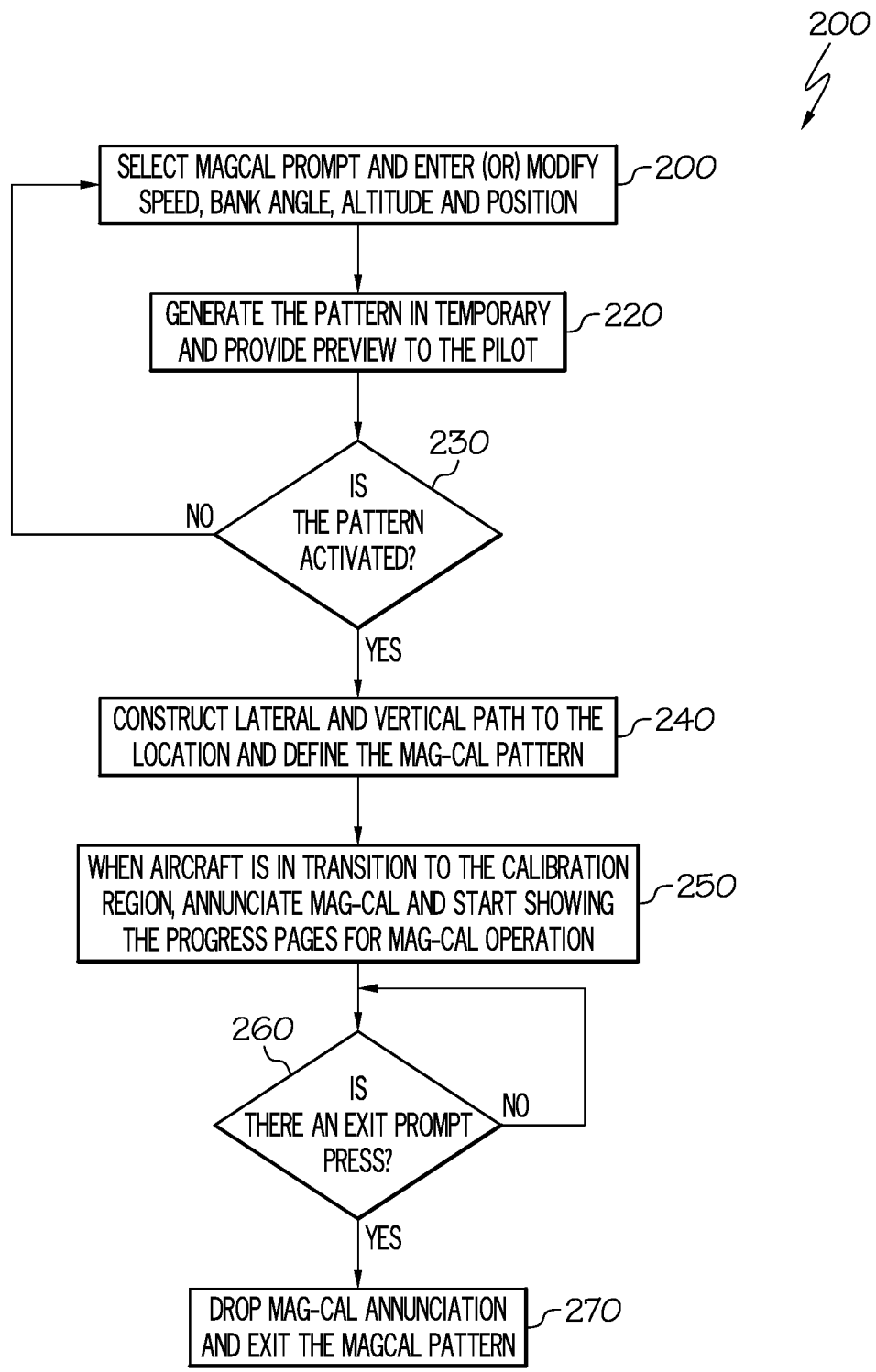
FIG. 2 is a process flow chart depicting an example process of the MAG-CAL pattern calibration system configured for use in an aircraft cockpit, in accordance with some embodiments.

FIG. 2 is a process flow chart depicting an example process 200 of the MAG-CAL pattern calibration system configured for use in an aircraft cockpit, in accordance with some embodiments. The order of operation within the process is not limited to the sequential execution as illustrated in the FIG. 2, but may be performed in one or more varying orders as applicable and in accordance with the present disclosure. In various embodiments, the process can be scheduled to run based on one or more predetermined events, and/or can run continuously during operation of the aircraft.

The process 200, initially begins with the pilot at 210 electing a MAG-CAL prompt to enter the FMS into a MAG-CAL mode and to enter or to modify parameters for the MAG-CAL pattern calibration of speed, bank angle, altitude and position of the aircraft while in-air. Next, at 220, the MAG-CAL pattern calibration system generates a pre-view pattern for the pilot to visually view prior to making the course changes or corrections during the flight phase. For execution purposes, the MAG-CAL pattern calibration is considered a temporary pattern subject to further manipulations by the pilot or an affirmative acquiesce by the pilot that the present generated MAG-CAL pattern calibration is both feasible on the present flight path of the aircraft and is sufficient to both meet or to compensate for the magnetometer errors in calibration at issue while still allowing the aircraft to meet its flight schedule without having to ask permission in the network for more time to meet a selected waypoint at or near approach notified by air traffic control. At step 230, a determination is made by the MAG-CAL pattern calibration system 100 whether the pattern can be or is activated, if it is not, then the flow reverts back to the step 210 and re-entering or modifying the inputs of the sensed data of the speed, bank angle, altitude and position parameters of the aircraft. The process is repeated and the pilot is again given an opportunity to pre-view a temporary generated calibration pattern at step 220.

Alternately, at the determination at step 230, if the pattern is activated (i.e. an affirmative response) then at step 240, the MAG-CAL pattern calibration system constructs lateral and vertical paths to the position and defines the MAG-CAL calculation pattern in the current flight phase at a particular region or period of a flight segment. At step 250, when the aircraft is in transition to the calibration region or calibration flight phase, an annunciation of the transition and subsequent mode change made be made by an annunciator system of the FMS coupled to the MAG-CAL pattern calibration system. In various exemplary embodiments, graphic displays may be rendered on the cockpit display systems 30 to show progressions of the MAG-CAL pattern calibration with indicators indicating a sufficiency level of the magnetometer calibration. For example, such progression displays may include highlight progresses in a figure eight calibration pattern, time estimations to completion, percentages of the calibration performed, levels of accuracy etc. In other words, there are a multitude of visual progress bar configurations that can be displayed on the cockpit display system to aid the pilot in understanding the proceeding incremental progress of the in-air calibration that can be dynamically displayed in real-time for situational awareness of the pilot of the state of the calibrating and the required time frame and progress to a level required of calibration.

Next, at step 260 there is a determination whether an "Exit" prompt has been actuated by the MAG-CAL pattern calibration or manually pressed by the pilot. If not, the flow reverts back to continue to hold or place the MAG-CAL pattern calibration system in a MAG-CAL mode for continuing the calibration operations. If not, then the flow proceeds to step 270 and the MAG-CAL annunciation is dropped or terminated in operation, and an "EXIT" operation with notifications is performed. The MAG-CAL mode is also terminated and the FMS system reverts back to another or prior flight operation mode.

Figure 3A:
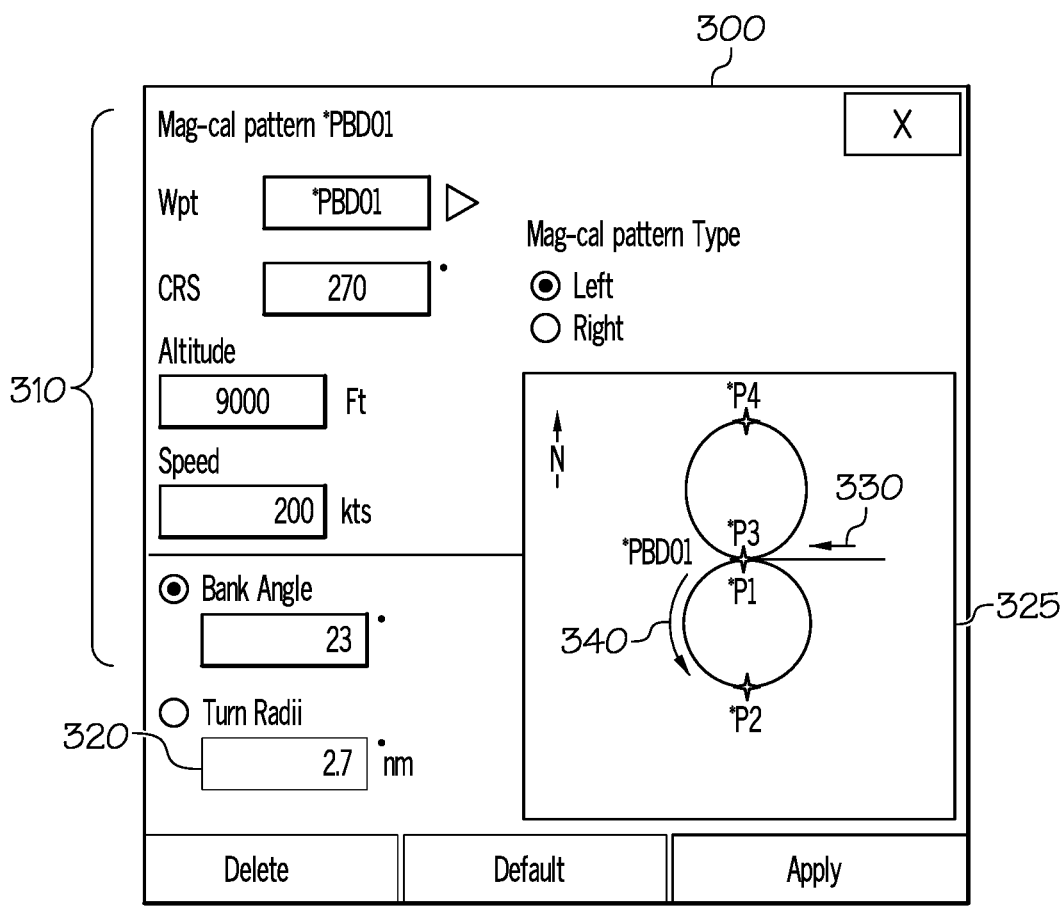
FIGS. 3A and 3B depict an integrated navigation (INAV) page and pattern data page on an INAV on a cockpit display of an aircraft for the MAG-CAL pattern calibration, in accordance with some embodiments.
Figure 3B:
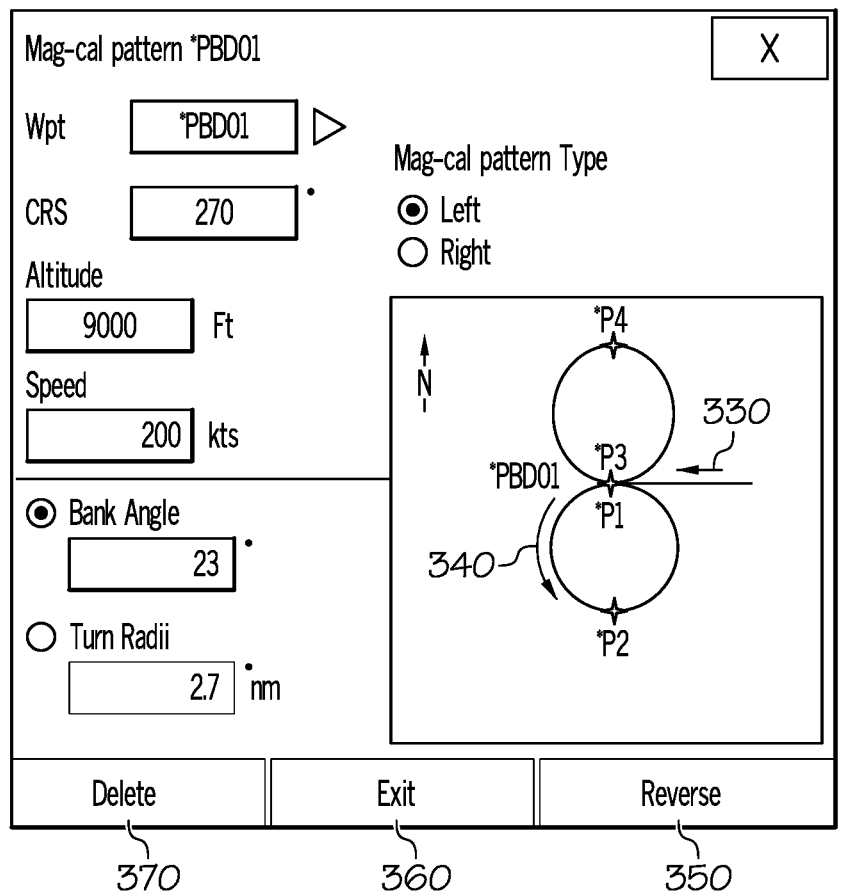

FIGS. 3A and 3B depict an instrument navigation (INAV) page and pattern data page on an INAV page of a cockpit display of an aircraft for the MAG-CAL pattern, in accordance with some embodiments.

The pilot may input parameters in the INAV page 300 associated with the MAG-CAL calculation pattern. For example, in FIG. 3A, this may consist of pattern inputs 310 of "Wpt" (ex. "PBD01"), "CRS" degree, Altitude, Speed, Bank Angle and MAG-CAL pattern type "left" or "right". The turn radii 320 is computed from the ground velocity (Vg) and bank factor values. The INAV page 300 includes a display portion of the entry of the aircraft into the pattern 330 and the direction of the pattern 340. It is contemplated that the display depiction of the inputs of the INAV page 300 is one of many configurations that may be used and the particular page depiction should not be construed as limiting. For example, the window 325 displaying the MAG-CAL pattern can re-sized and reconfigured within the display as desired as can be the other inputs.

With a reference to FIG. 3B, the pattern data page on INAV at the bottom of the display page includes a "delete" prompt 370 to delete the pattern. This "delete" prompt 370 is deactivated once the aircraft (A/C) is traversing in-air the MAG-CAL calculation pattern. The "Exit" prompt 360 is to EXIT the MAG-CAL calculation pattern. The "Reverse" prompt 350 is to reverse the turn direction of the MAG-CAL calculation pattern. Therefore, the speed entered by the pilot is converted to its corresponding ground speed and the turn radii of the arcs are obtained with the entered bank angle value. With the aircraft course, latitude and longitude data of the fix (i.e. entry into the MAG-CAL calculation pattern 330 labeled "PBD01"), and the turn direction input provides the waypoints P1, P2, P3, P4 are constructed. The set of waypoints P1, P2, P3 and P4 are inserted into the flight plan, and the aircraft proceeds on the flight path until the time pilot manually triggers the "EXIT" prompt 360 to exit the MAG-CAL calculation pattern. When the pilot selects the "Reverse" prompt 350 the MAG-CAL calculation pattern and corresponding set of waypoints P1, P2, P3 and P4 are modified to the turn direction in the MAG-CAL calculation pattern.

Figure 4:
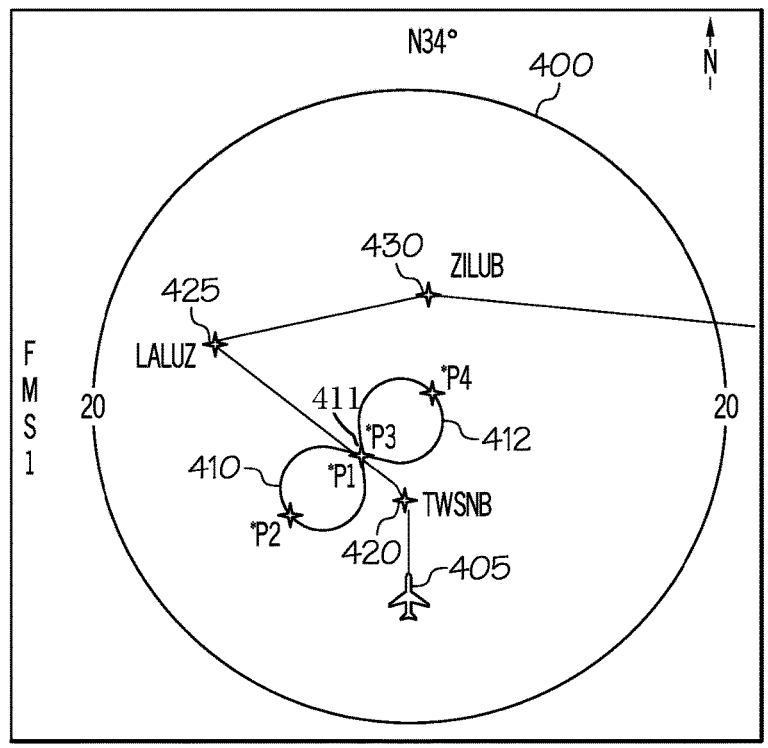
FIG. 4 depicts a lateral map view on a cockpit display with waypoints of an aircraft flight path to proceeding in an exemplary figure eight pattern for the MAG-CAL pattern calibration, in accordance with some embodiments.

FIG. 4 depicts a lateral map view on a cockpit display with waypoints of an aircraft flight path to proceed in an exemplary figure eight pattern for the MAG-CAL pattern calibration, in accordance with some embodiments. In FIG. 4, the lateral map view 400 shows an aircraft 405 proceeding with a lateral navigation (LNAV) flight path to 420 "TWSNB" to 425 "LALUZ" and then to 430 "ZILUB". The set of input data entered manually by the pilot are depicted FIGS. 3A and 3B. The speed entered by the pilot is converted to a corresponding ground velocity (Vg) and the turn radii of the arcs are obtained with the entered bank angle value. With the course TWSNB 420 to LALUZ 425 then to ZILUB 430 entered in the initial flight plan, the additional fix point at 411 is entered with a latitude and a longitude data so the aircraft 405 can proceed to waypoint P1 via loop 410 to waypoint P2 of the first part of the figure eight MAG-CAL calculation pattern and then to waypoint P3 continuing via 412 to the second part of the figure eight MAG-CAL calculation pattern to waypoint P4. The aircraft (405) continues on the second part of the figure eight MAG-CAL calculation pattern until the desired level of calibration has been achieved for the magnetometer. For example, the aircraft (405) may not need to or complete the rest of the MAG-CAL calibration pattern flight path if the desired level of calibration occurs prior to a completion; in which case, the aircraft (405) may simply leave or cut short the calibration flight path (ex. by intervention of the pilot to change the flightpath and exit out of the MAG-CAL calibration region) and continue directly to the destination via a new flight path or the original flight. In various exemplary embodiments, the aircraft 405 enters the MAG-CAL calculation region, and turn directions are provided by each of the waypoints P1, P2, P3, P4 which are constructed by the MAG-CAL calculation system as the flight path for the aircraft 405 taking into account the original flight plan. The figure eight pattern is required to take into account all directions for calibration of the aircraft (405) on both sides of the aircraft (405) to ensure the magnetometer is calibrated in all directions on in of by the aircraft making complete rotations of the left side and on the right side. In various exemplary embodiments, the MAG-CAL calculation region can be configured to split the figure eight pattern in a first part and a second part; for the aircraft (405) to calibrate a first part by following a first flight path defined by P1 and P2; and then calibrate a second part, by following a second flight path defined by P3 and P3. In such cases, a convenient process is provided to divide the calibration flight path when desired or for better integration or embedding to the current aircraft flight path (i.e. the original flight path). In various exemplary embodiments, the MAG-CAL calculation system may use applications to configure several potential different MAG-CAL calculation patterns where the pilot can select a particular set of waypoints or select a particular pattern and subsequently select when in the flight plan or flight phase to execute the MAG-CAL calculation process. The set of waypoints may, in some instances, be inserted into the flight plan or even temporarily inserted in the flight plan until approved by the pilot. The pilot, in some instances, is given the opportunity to monitor the incremental progress of the MAG-CAL calculation and may choose when to the exit or terminate the MAG-CAL calculation and resume the original flight plan. For example, the pilot may incur a multitude of real-time flight issues such as experiencing severe turbulence in the MAG-CAL calculation flight path or is required to change course to reach a particular waypoint within a particular time and therefore must omit the extra flight time required to perform the MAG-CAL calculation or can only perform an 80% MAG-CAL calculation due to the time constraints, fuel supply etc. In other alternative situations, the pilot may manually reconfigure the MAG-CAL calculation pattern by, as an example, choosing a reverse MAG-CAL calculation pattern and set the waypoints modified with the reverse turn direction for aircraft 405.

Figure 5:
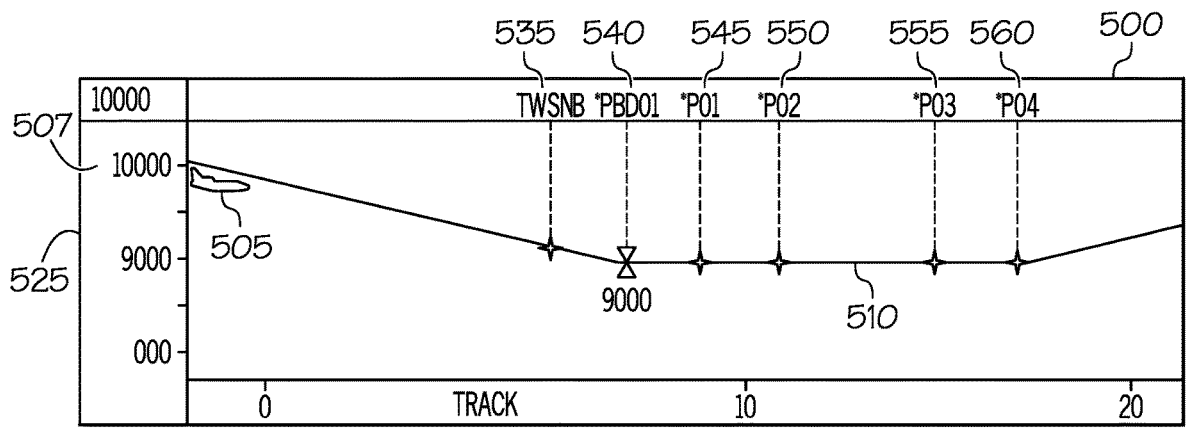
FIG. 5 depicts a vertical situational display (VSD) map view on a cockpit display with altitude constraints of an aircraft flight path to proceed on a figure eight pattern for the MAG-CAL pattern calibration, in accordance with some embodiments.

FIG. 5 depicts a vertical situational display (VSD) 500 map view on a cockpit display with altitude constraints of an aircraft flight path to proceed on a figure eight pattern for the MAG-CAL pattern calibration, in accordance with some embodiments. In FIG. 5, the aircraft 505 is initially at an altitude of 10,000 feet at 507, then proceeds to a lower altitude (close to 9000 feet) at 535 at TWSNB. Next, the aircraft 505 enters the MAG-CAL calculation region at 9000 feet at 520. The aircraft 505 is held at a constant altitude of 9000 feet when traversing the flight path for the MAG-CAL calculation. That is, the aircraft 505 enters the MAG-CAL calculation path at 540 PBD01 at 9000 feet, then continues at 9000 feet to waypoint P1 at 545, then keeping at the same altitude continues to waypoint P2 at 545, and then on to waypoints P3 at 555 and P4 at 560. The VSD display 500 shows a level segment for the MAG-CAL pattern calibration 510.

Figure 6A:
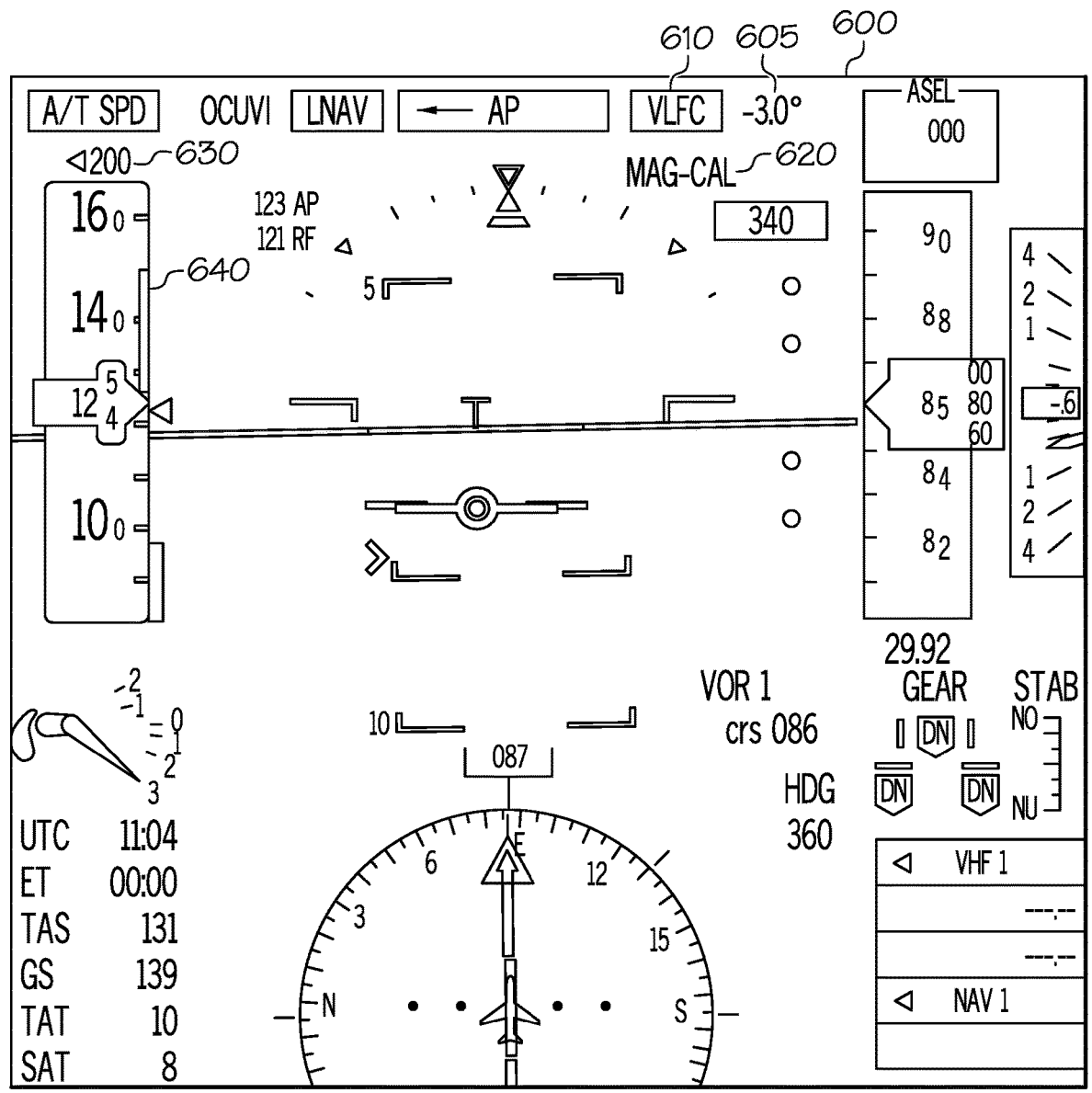
FIGS. 6A and 6B depict notifications on-display of modes changes in the cockpit display while just before or prior to the aircraft enters on a pattern flight path for the MAG-CAL calculation and when the aircraft actually has or about to enter the calibration pattern flight path (i.e. an exemplary figure eight pattern for the MAG-CAL pattern calibration) in accordance with some embodiments.
Figure 6B:
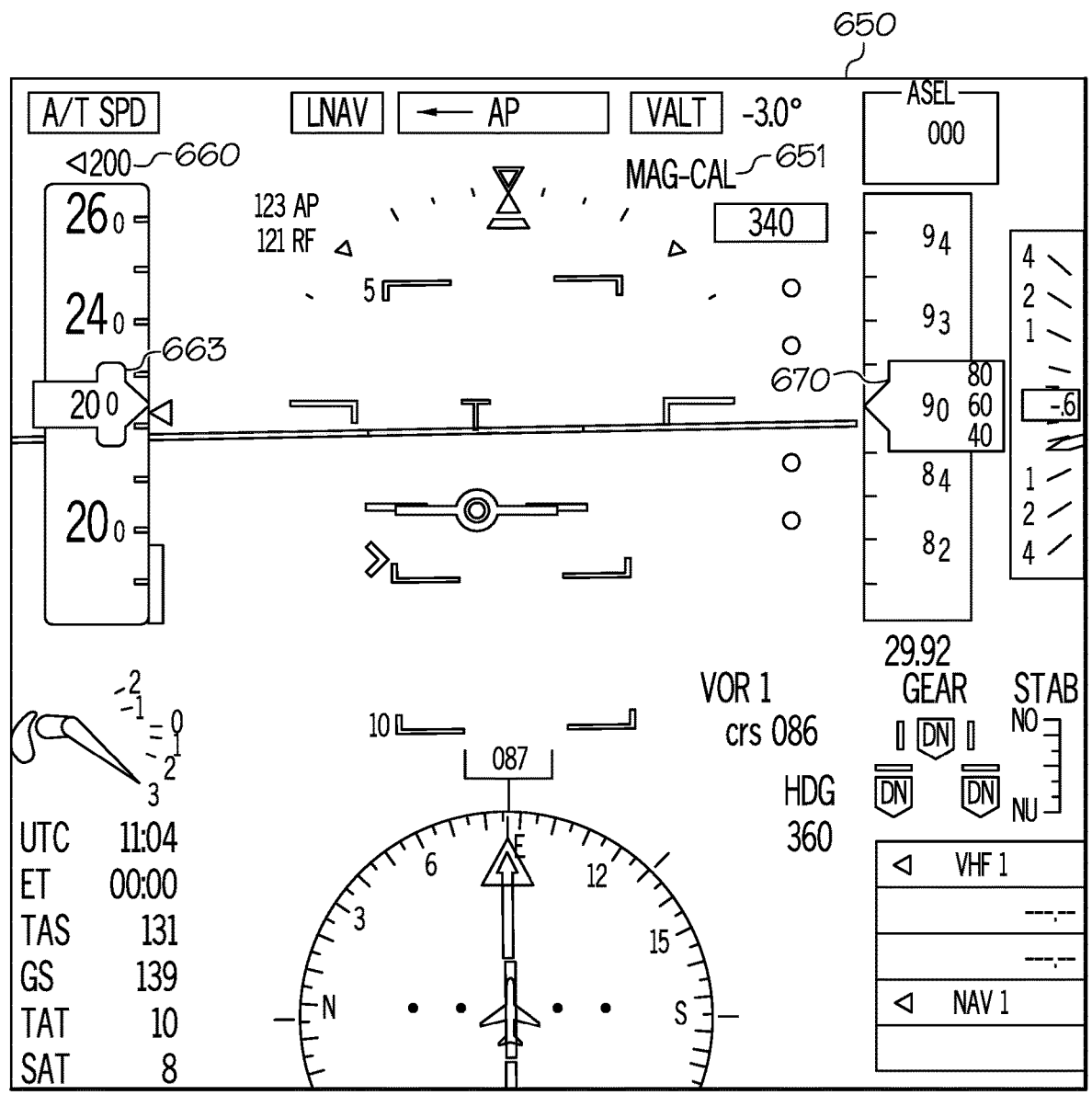

FIGS. 6A and 6B depict notifications on-display of modes changes in the cockpit display just before or prior to the aircraft enters on a pattern flight path for the MAG-CAL calculation and when the aircraft actually has or about to enter the calibration pattern flight path (i.e. an exemplary figure eight pattern for the MAG-CAL pattern calibration) in accordance with some embodiments. In FIG. 6A, the cockpit display 600 provides on a display a change of mode notification when flying into or just entering (i.e. moments prior to entering) the MAG-CAL calculation pattern. In an exemplary embodiment of a notification of a vertical navigation (VNAV) mode change from a flight level change (FLCH) mode to an automatic landing for vertical and/or short take-off and landing (VALT) mode; a "VLFC" label is displayed to the pilot at 610 just before entering the calibration pattern flight path. The MAG-CAL calculation mode label 605 is configured by a timer to flash approximately 2 minutes prior to the aircraft entering into the MAG-CAL calculation pattern flight path 620. The flashing provides an on-screen immediate warning to the pilot that the aircraft is deviating from the original flight plan so the pilot is provided immediate situational awareness that the magnetometer calibration is about to occur and that the aircraft flight plan is changing as a result. The timer can pre-set as desired, for example configured in a plethora of other ways to provide notification such as to flash in 4 minutes, 8 minutes or other times in advance, to change colors or to change levels of illumination, or to include visual and aural (and voice) annunciations prior to entry in the MAG-CAL calculation flight path pattern. In addition, the target speed is changed to "200" nautical miles per hour at 630 which is the MAG-CAL calculation pattern speed for proceeding to the waypoints that are constructed for the MAG-CAL calculation pattern. The speed anticipation at 640 provides notification to the pilot on the cockpit display 600 of the in-progress speed anticipation by a visual indicator to achieve the MAG-CAL calculation pattern speed. Hence, the pilot can adjust the aircraft speed by visually looking at the indicator of the in-progress speed to quicken the rate or reduce the rate of progression to the MAG-CAL calculation pattern speed during change of altitude upward or downward (i.e. in this case, the aircraft decent to 9000 feet) to save fuel or to meet other desired flight goals as desired.

In FIG. 6B, the cockpit display 655 provides an on-display notification of modes on the MAG-CAL calculation pattern entry. The "VLFC" label displayed in FIG. 5A, is changed to "VALT" to indicate that the aircraft in flying in VALT mode when entering into the MAG-CAL calculation pattern flight path. The MAG-CAL mode label at 657 remains displayed and the display is unchanged for both the modes of the aircraft just before entering the MAG-CAL calculation pattern flight path and MAG-CAL calculation flight path entry. The target speed which is changed and displayed as "200" nautical miles per hour at 660 is the MAG-CAL calculation target speed displayed. The flying at the MAG-CAL calculation target speed is also displayed at 665 so the pilot can check the current aircraft speed to the MAG-CAL calculation target speed to ensure that both displayed speeds are in align for the MAG-CAL calculation process. In addition, by monitoring displayed speeds; the target speed and the current or real-time speed of the aircraft, the pilot can ensure that the aircraft is flying at the correct speed to enable proper MAG-CAL calculation of the magnetometer. For example, the pilot may need to tweak the aircraft thrust due to tailwind, turbulence etc., to maintain the required speed within a margin for proper in-air calibration to proceed. Also displayed on the cockpit display, is notification at 670 that the aircraft is flying at the MAG-CAL calculation altitude on the cockpit display 650 provide additional vertical situational awareness to the pilot without the pilot's attention having to revert to the other VSD display for this information.

Figure 7:
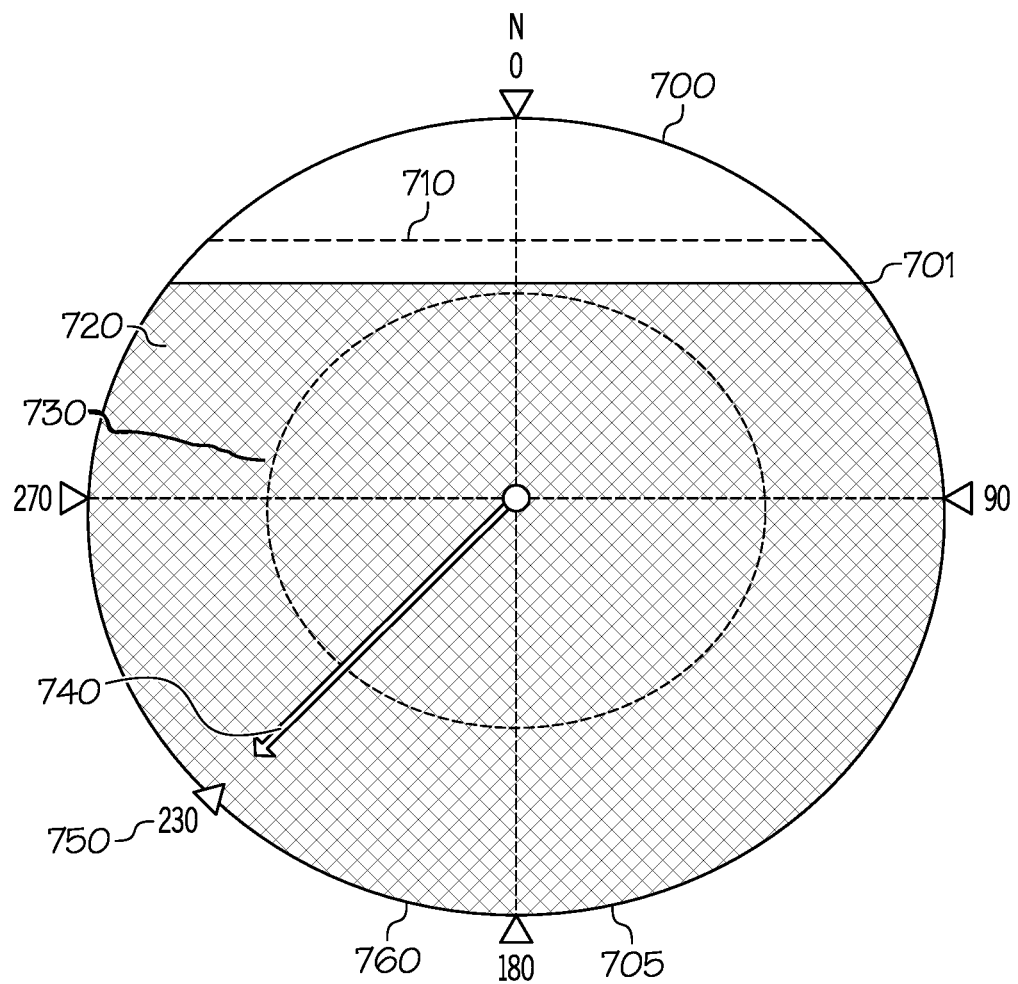
FIG. 7 illustrates a diagram of the status and the progress of the in-air MAG-CAL calculation mode by a visual display of completeness, in accordance with some embodiments.

FIG. 7 illustrates a diagram of the status and the progress of the in-air MAG-CAL calculation mode by a visual display, in accordance with some embodiments. In FIG. 7, there is illustrated a symbol diagram 700 that can be rendered on the INAV display to depict the status of the in-air MAG-CAL calculation as the calibration progressively continues to completion in conjunction with the display of the aircraft in MAG-CAL mode. The symbol diagram 700 is a visual indicator that is configured in accordance with FAA regulations to not interfere with the flying duties of the flight-crew. In addition, the symbol diagram 700 includes a fill-in portion 705 and not filled in portion 707 that contrasts sufficiently with each other in color or gray-scale and is provided with sufficient luminescence that can be clearly visible under adverse lighting or weather conditions on the cockpit display to the pilot. The symbol diagram 700 is provided with a manually adjustable limit or threshold configuration setting to set a level of accuracy of completeness based on a Kalman filtering application solution of the MAG-CAL calculation system. For example, the data can be tracked of the level of accuracy of the calibration using a Kalman filter (i.e. using a mean square error minimizer) based on comparisons of historical statistical calibration data of the in-air calibration of a magnetometer for the particular type of aircraft to ensure a certain level of accuracy even when the MAG-CAL calculation mode is not entirely finished. The level at 710 is adjustable by the pilot and when adjusted there may be on-screen displayed data of accuracy and completeness. The status of completion (i.e. the filled amount) of the symbol diagram 700 is shown by an overlay 720 fill-in with a status (ex. as "80%") of the filled-in region. There are various demarcations by overlaid line segments (ex. at 730 showing a 50% completeness) so the pilot can visually see progressions of completeness in the symbol diagram 700. The direction of the earth magnetic field vector 740 is shown within the symbol diagram 700, as well as the bearing read out 760 (ex. "230" degrees) between the "180" degree and "270" degree bearing markings on the symbol diagram 700. Also, the normalized magnitude of the earth magnetic field vector 760 is displayed (ex. "0.8" vector magnitude).

Figure 8:
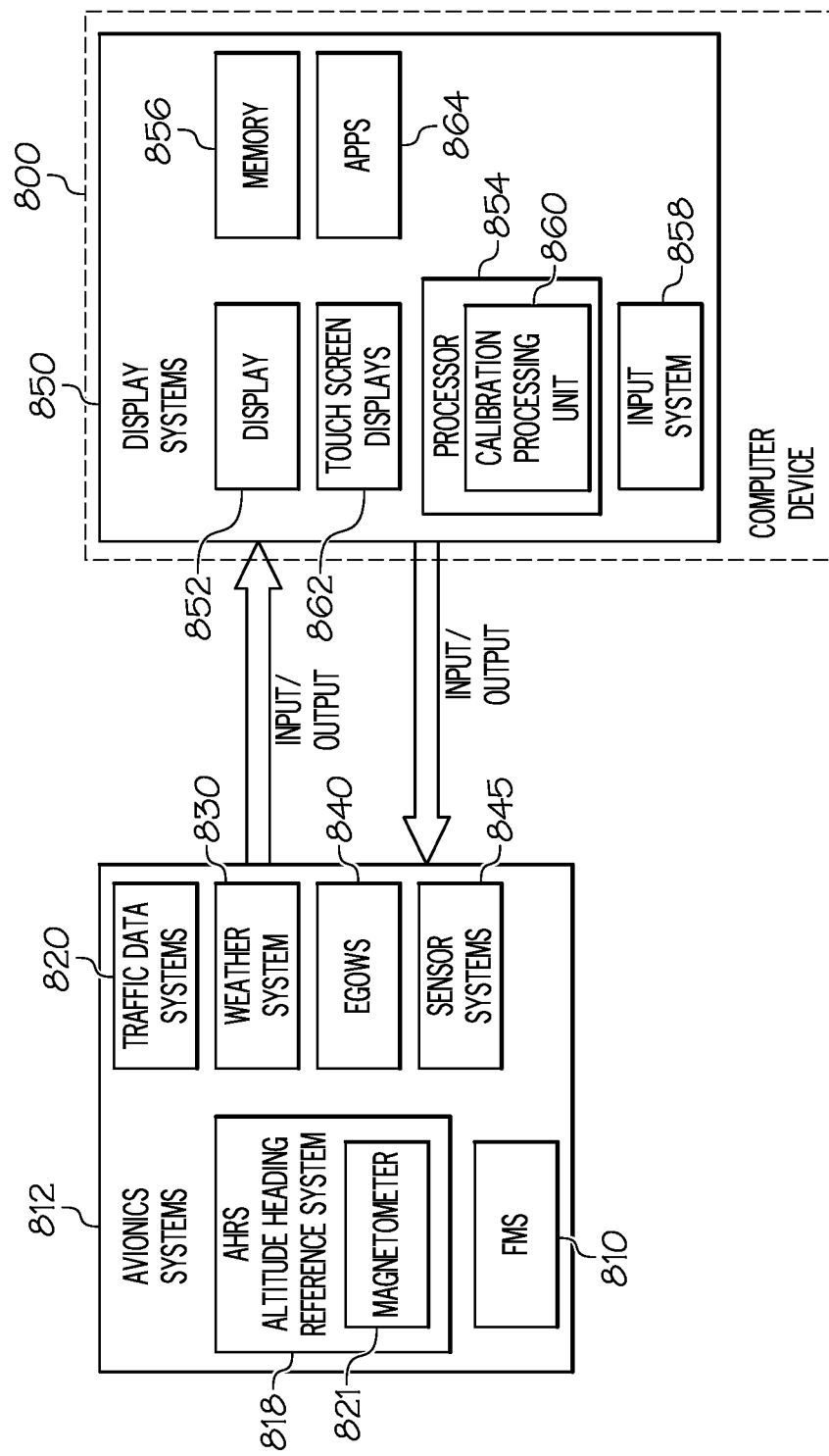
FIG. 8 illustrates an exemplary aircraft system, in accordance with some embodiments.

FIG. 8 illustrates an exemplary aircraft system with a computer 800, in accordance with some embodiments. The aircraft system of FIG. 8 may be, for example, configured for a spacecraft, a helicopter, a drone, or any other vehicle which is capable of flight. The avionics system 812 includes at least as an exemplary model the following: a flight management system (FMS) 810, a attitude heading reference system (AHRS) 818, a Traffic Data System (TDS) 820, a weather system 830, a sensor system 845 and an Enhanced Ground Proximity Warning System (EGPWS) 840. The FMS 810 is a fundamental component of a modern airliner's avionics. An FMS is a specialized computer system that automates a wide variety of in-flight tasks, reducing the workload on the flight crew. A primary function is in-flight management of the flight plan. Using data received from a global positioning system to determine the position of the aircraft, the FMS 810 may guide the vehicle along the flight plan and the calibration pattern flight plan.

The FMS 810 may be communicatively coupled, via one or more communication buses, to the Traffic Data System (TDS) 820, the weather system 830, the sensor system 845 and the Enhanced Ground Proximity Warning System (EGPWS) 840. The TDS 820 tracks traffic of other aircrafts in proximity to the aircraft. Likewise, the weather system tracks the weather in the proximity of the aircraft. The EGPWS 840 maintains a terrain database (e.g., the location of mountains) for use in the navigation of the aircraft. The sensor system 845 receives sensed data from aircraft sensors. There are other avionics systems not included but the exemplary avionics systems 812 are contemplated to include a host of other avionic systems.

The aircraft system may be hosted on a computer device 800 and further includes a display system 850 (i.e. an INAV or a multi-control display unit (MCDU) cockpit display) with the calibrated flight plan pattern. The display system 850 receives data from the FMS 810, traffic data system (TDS) 820, weather system 830 and EGPWS 140 via one or more data busses. The display system 850 displays a lateral and vertical profile of the flight plan of the aircraft in relation to data received from the calibration processing unit 890, the TDS 820, the weather system 830, the sensor system 845 and the EGPWS 840. In one embodiment, for example, the display system 850 may be mounted within a cockpit of the aircraft. However, the display system 850 could be implemented on a portable device (i.e. computer device 800) which is carried into the aircraft, such as a tablet, a laptop or the like. The display system 850 can allow the pilot or other operator within the aircraft systems the ability to edit the flight plan within the vertical profile display and horizontal display. In various exemplary embodiments, the display system may be configured as a situation display system with editing tools that utilize simple intuitive inputs to edit the flight plan without the complex menus.

The display system 850 includes a display 852. The display 852 may be dedicated to the display system 850 or may be shared by one or more other components within the aircraft. The display 852 may be a cathode ray tube (CRT) display, a liquid crystal display (LCD), a light emitting diode (LED) display, a plasma display, or the like.

In an exemplary display 852, the upper portion of the display 852 may include a lateral display illustrating a lateral profile of the flight plan of the aircraft, therein illustrated as an aircraft. The lateral display may show the lateral profile of the flight plan as a line representing a heading of the aircraft and also illustrates restrictions within a path of the flight plan as well as restrictions within the vicinity of the aircraft. The lower portion of the display may include a vertical display illustrating a vertical profile of the flight plan of the aircraft. The restrictions may be aircraft performance constraints such as those imposed by the calibration pattern path generated and calibration processing process, as well as customary restrictions such as the maximum certified altitude, operational altitude envelopes, or the like, regulatory constraints such as ICAO flight levels, traffic congestions, safety altitude limits, or the like, flight plan restrictions such as down-path altitude, speed, time constraints, or the like, and/or environmental obstacles such as weather, traffic, terrain, or the like. The restrictions may be based upon data from the TDS 820, weather events received from the weather system 830, and/or ground elements (e.g., mountains, building's, etc.) from the EGPWS 840, or regulatory restrictions such as restricted airspace or aircraft operation restrictions stored in the FMS 810. The vertical axis within the vertical display corresponds to an altitude of the aircraft. The horizontal axis within the vertical display corresponds to a distance in nautical miles from the current location of the aircraft.

In FIG. 8, the display system 850 includes one or more processors 854 for use in the calibration processing unit 860 for generating the waypoints for calibration pattern flight path and the other attributes such air speed, altitude etc. for the magnetometer in-air calibration. The processor(s) 854 may be a central processing unit (CPU), a graphics processing unit (GPU), an application specific integrated circuit (ASIC), a field programmable gate array (FPGA), a microcontroller, or any other logic device or combination thereof. While FIG. 8 illustrates the processor(s) 854 as being part of the display system 850, the processor(s) 854 may be located in any portion of the aircraft and may be dedicated to the display system 850 or shared by one or more other systems of the aircraft. The processor(s) 854 is coupled to the display 852 and to the FMS 810, TDS 820, weather system 830, the sensor system 845, EGPWS 840, and an attitude heading reference system (AHRS) 818 with a magnetometer 821 via one or more data busses.

The display system 850 further includes a memory 856 coupled to the processor 854 via a data bus. The memory 856 may be any combination of volatile and non-volatile memory. The memory 856 may be any non-transitory computer readable medium storing instructions, which when implemented by a processor, cause the processor to implement the situation display as discussed herein. The AHRS 818 may include one or more processors with may be any non-transitory computer readable medium storing instructions, which when implemented by a processor, cause the processor to implement calibration processes to calibrate as discussed herein the magnetometer 821.

The display system 850 also includes an input system 858. While FIG. 8 illustrates the input system 858 as being part of the display system 850, the input system 858 could be located anywhere within the aircraft and may be dedicated to the display system 850 or shared by one or more other systems within the aircraft. The input system 858 may be a touch screen, a cursor based system (e.g., a trackball, a mouse, a touch pad, or the like), a microphone (i.e., for voice commands with/without visual and aural alerts) a keyboard, button, knobs, or the like, or any combination thereof. The input system 858 can be utilized by a user of the aircraft to alter the flight plan of the aircraft through the display system 850, as discussed in further detail below.

The example display 852 may include a touchscreen system (TSC) 862 coupled to avionics systems 812 in an aircraft. The TSC 862 may be configured to be mounted in an aircraft cockpit in place of a multi-purpose control/display unit (MCDU). The avionics interface (not shown) may include an avionics interface such as a standard MCDU interface existing in a legacy or in-service cockpit. The avionics interface may include an ARINC 429 compliant interface, an ARINC 739 compliant interface, an RS232 interface, and/or an interface for a proprietary aircraft data transfer system.

The avionics systems 812 may include a variety of flight deck systems, such as a flight director (FD) system, a communication management function (CMF), a maintenance system, communication/navigation systems, radio systems, central maintenance computers (CMCs), forward display control systems, and other avionics systems utilized to open and interact with navigational charts, to list but a few examples. The example touchscreen system 862 is configured to generate What-IF 3D (three-dimensional, or even 4D trajectories) trajectories based on the MAG-CAL calculation processing unit 860 outputs. The example touchscreen system 862 is configured to decode/interpret flight plan (FPLN) data received from the avionics systems 812, implement flight plan modifications for the MAG-CAL calculation pattern, and generate What-IF 3D Trajectories for the temporal calibration patterns. The example touchscreen system 802 is further configured to, e.g., when a calibration pattern flight plan instruction is to fly a HOLD or constant altitude in a calibration region, compute the fuel required to fly the HOLD and verify whether the remaining fuel onboard is sufficient to fly the HOLD and complete the original flight plan to a destination.

The processors and memory of the example are configured by the executable programming instructions to provide a data mining functions, a flight plan and trajectory generating functions, and one or more applications programs (APPs) 864. The example application programs when executing may cause the generation of display screens containing widgets and other graphical elements on the display of the touchscreen system 862 or the display 852; for example the graphics symbol configured to show the incremental progression of the calibration process with filled-in and not filled-in portions. The example Apps 864 include one or more flight crew decision aid applications configured to present options to a flight crew for the display of simulated data via the touchscreen display, and display data from the one or more theoretical trajectories for the temporal calibration patterns on the touch screen display. Retrieving aircraft data may include retrieving aircraft data from avionics systems such as an FMS 810 or a communication management function (CMF) not shown. The aircraft data may include, but not limited to, one or more of flight plan data, fuel and weights data, ATC log data, aircraft state data, and aircraft sensors data.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A computer-implemented method for calibrating magnetic distortions of an attitude heading reference system (AHRS) of an aircraft, the method comprising:

executing a magnetometer calibration (MAG-CAL) application of the AHRS disposed with a magnetometer, while the aircraft is in-flight, to enable an in-air calibration of the magnetometer of the aircraft while proceeding on a flight of an original flight-path;

generating, by calculations using software solutions of the MAG-CAL application, a MAG-CAL calculated pattern based on a set of aircraft parameters for the in-air magnetometer calibration, wherein the set of aircraft parameters at least comprises: speed, bank angle, altitude, and position of the aircraft, wherein the MAG-CAL calculated pattern is configured in a figure-eight pattern to take into account all directions for calibration of the aircraft on both sides of the aircraft;

generating, by the MAG-CAL application, a set of waypoints that define a calibration flight path corresponding to the MAG-CAL calculated figure-eight pattern;

configuring, by the MAG-CAL application, the calibration flight path of the MAG-CAL calculated figure-eight pattern to be part of the original flight path of the in-flight aircraft to enable the aircraft, while flying the original flight-path, to proceed in part on the calibration flight path corresponding to the MAG-CAL calculated figure-eight pattern; and generating position data for lateral and vertical flight paths, by the MAG-CAL application, to enable the aircraft to deviate, while in-flight, from the original flight-path to the calibration flight path, wherein the aircraft proceeds on the calibration flight path for a time period to enable a required level of calibration of the magnetometer for operation, wherein the required level of calibration is determined by the MAG-CAL application based on an aircraft flying in a calibration region to enable a MAG-CAL calibrating process to occur to reach at least one threshold indicative of a required calibration level for a magnetometer operation.

2. The method of claim 1, further comprising:
selecting a prompt of a MAG-CAL calculation system to execute the MAG-CAL application or to modify a set of MAG-CAL parameters used by the MAG-CAL application.

3. The method of claim 1, further comprising:
enabling mode annunciations by the AHRS in a cockpit to provide situational awareness by visual or aural alerts to a pilot that a current flight path of aircraft is within the calibration region.

4. The method of claim 1, further comprising:
displaying progress visually of the in-air MAG-CAL calibrating process so that a pilot can determine, in a primary instance, when the magnetometer is calibrated to a desired level of accuracy, and in a secondary instance, an approximate in-flight time to complete the MAG-CAL calculation process.

5. The method of claim 1, further comprising:
enabling a preview of a MAG-CAL specific pattern for view by a pilot on a cockpit display prior to a deviation from the original flight-path by the aircraft to the calibration flight path to perform an in-air calibration process.

6. The method of claim 1, further comprising:
enabling aircraft mode annunciations to provide situational awareness and provide an efficient calibration platform for the magnetometer to be calibrated while entering or flying within the calibration region.

7. The method of claim 1, further comprising:
filling-in portions of a graphic user interface configured in a symbol to show a desired level of accuracy of a calibration process by a filled-in region in comparison to a not filled-in portion.

8. The method of claim 1, further comprising:
configuring a set of modes to display the position of the aircraft prior to and on entry to the calibration region.

9. The method of claim 8, further comprising:
configuring a lateral flight path of the aircraft at a select altitude, latitude, and longitude after entry to the calibration region for a calibration process; and
configuring the speed of the aircraft at a select speed for an effective calibration process.

10. An apparatus for calibrating magnetic distortions of an attitude heading reference system (AHRS) installed in a cockpit of an aircraft, the apparatus comprising:
at least one processor deployed on a computing device, the at least one processor is programmed to calibrate the AHRS disposed with a magnetometer while the aircraft is in-flight to enable an in-air calibration of the magnetometer of the aircraft while proceeding on a flight of an original flight-path;
the at least one processor having an input coupled to receive sensor data from at least one sensor system deployed on the aircraft;
the at least one processor having an associated memory for acquiring a set of aircraft parameter data which at least comprise: speed, bank angle, altitude and position of the aircraft;
the at least one processor is programmed to execute an algorithm which calculates a magnetic calibration (MAG-CAL) calculated pattern based on the set of aircraft parameter data for the in-air magnetometer calibration wherein the MAG-CAL calculated pattern is configured in a figure-eight to take into account all directions for calibration of the aircraft on both sides of the aircraft;
the at least one processor is configured to generate a set of waypoints that define a calibration flight path corresponding to the MAG-CAL calculated figure-eight pattern;
the at least one processor configuring the calibration flight path of the MAG-CAL calculated figure-eight pattern to be part of the original flight path of the in-flight aircraft to enable the aircraft while flying the original flight-path to proceed in part on the calibration flight path corresponding to the MAG-CAL calculated figure-eight pattern;

the at least one processor programmed to generate position data for lateral and vertical flight paths to enable the aircraft to deviate while in-flight from the original flight path to the calibration flight path, wherein the aircraft proceeds on the calibration flight path for a time period to enable a required level of calibration of the magnetometer for operation wherein the required level of calibration is determined by a MAG-CAL application based on an amount of flight time for the aircraft to cover a calibration region defined by the calibration flight path and the aircraft position; and
the at least one processor programmed to execute a MAG-CAL calculation process to reach at least one threshold indicative of a required calibration level for magnetometer operation.

11. The apparatus of claim 10, further comprising:
the at least one processor to be responsive to a pilot selection by a prompt to execute the MAG-CAL calculation process or to modify a set of MAG-CAL parameter data used in the MAG-CAL process.

12. The apparatus of claim 10, further comprising:
the at least one processor is configured to alert a pilot, in instances, by mode annunciations of the AHRS in the cockpit thereby providing situational awareness by visual or aural alerts to the pilot that a flight path of aircraft is within the calibration region.

13. The apparatus of claim 10, further comprising:
the at least one processor programmed with instructions for filling-in portions of a graphical user interface configured in a symbol to show a desired level of accuracy of a calibration process by a filled-in region in comparison to a not filled-in portion.

14. The apparatus of claim 10, further comprising:
the at least one processor configuring a set of modes to display the position of the aircraft approximately prior to and on entry to the calibration region.

15. The apparatus of claim 10, further comprising:
the at least one processor setting a lateral flight path of the aircraft at a select calibration altitude, latitude and longitude after entry to the calibration region for the calibration process.

16. The apparatus of claim 10, further comprising:
the at least one processor setting the speed of the aircraft at a selected speed for a calibration process.

17. A system to perform a set of instructions contained on a non-transitory computer-readable medium executed by at least one processor,
the system comprising the at least one processor programmed and disposed in a computing device to:
implement a magnetometer calibration (MAG-CAL) application hosted by the computing device for calibrating a magnetometer of an aircraft while in-flight to enable an in-air calibration of the magnetometer while proceeding on a flight of an original flight-plan;
generate, by calculations using software solutions of the MAG-CAL application, a MAG-CAL calculated pattern based on a set of aircraft parameters for the in-air magnetometer calibration, the set of aircraft parameters at least comprise: speed, bank angle, altitude and position of the aircraft wherein the MAG-CAL calculated pattern is configured in a figure-eight to take into account all directions for calibration of the aircraft on both sides of the aircraft;
generate, by the MAG-CAL application, a set of waypoints that define a calibration flight path corresponding to the MAG-CAL calculated figure-eight pattern;

configure, by the MAG-CAL application, the calibration flight path of the MAG-CAL calculated figure-eight pattern to be part of the original flight-plan of the in-flight aircraft to enable the aircraft while flying the original flight-plan to proceed in part on the calibration flight path corresponding to the MAG-CAL calculated figure-eight pattern; and generate position data for lateral and vertical flight paths, by the MAG-CAL application, to enable the aircraft to deviate while in-flight from the original flight-plan to the calibration flight path, wherein the aircraft proceeds on the calibration flight path for a time period to enable a required level of calibration of the magnetometer for operation wherein the required level of calibration is determined by the MAG-CAL application based on an aircraft flying in a calibration region to enable a MAG-CAL calibrating process to occur to reach at least one threshold indicative of a required calibration level for a magnetometer operation.

18. The system of claim 17, further comprising:

the at least one processor programmed by the set of instructions to visually display the in-air MAG-CAL calibrating process so that a pilot can determine an approximate in-flight time to complete the MAG-CAL calibrating process.

19. The system of claim 17, further comprising:

the at least one processor programmed by the set of instructions to implement a preview of a MAG-CAL specific pattern for view by a pilot on a cockpit display prior to the deviation from the original flight-plan by the aircraft to the calibration flight path to perform the in-air calibration process.

20. The system of claim 17, further comprising:

the at least one processor programmed by the set of instructions to implement:

a set of one or more mode annunciations by the computer device disposed of in an attitude heading reference system (AHRS) in a cockpit to provide situational awareness by visual and aural alerts to a pilot of a flight path of the aircraft entering or current flight path within the calibration region.

* * * * *